(12) United States Patent
Baruch

(10) Patent No.: US 6,709,729 B2
(45) Date of Patent: Mar. 23, 2004

(54) THREE DIMENSIONAL PROTECTIVE PADS

(76) Inventor: Alan Baruch, 125 Morningstar Dr., Punta Gorda, FL (US) 33982

( * ) Notice: Subject to any disclaimer, the term of this patent is extended or adjusted under 35 U.S.C. 154(b) by 120 days.

(21) Appl. No.: 10/001,340

(22) Filed: Nov. 23, 2001

(65) Prior Publication Data

US 2002/0094430 A1 Jul. 18, 2002

Related U.S. Application Data

(63) Continuation of application No. 09/294,116, filed on Apr. 19, 1999, now abandoned, which is a continuation-in-part of application No. 09/143,408, filed on Aug. 28, 1998, now abandoned, which is a continuation-in-part of application No. 08/953,285, filed on Oct. 17, 1997, now abandoned.

(51) Int. Cl.[7] .............................. B32B 3/08; B32B 3/10; B32B 3/04; A41D 13/015

(52) U.S. Cl. ...................... 428/101; 428/126; 428/127; 428/135; 428/138; 428/314.4; 428/316.6; 428/318.4; 2/455; 2/16; 2/22; 2/24

(58) Field of Search .......................... 428/304.4, 314.4, 428/316.6, 318.4, 911, 909, 474.4, 776.3, 500, 131, 134, 135, 136, 137, 138, 121, 124, 101, 126, 127; 442/315; 2/455, 459, 463–468, 410, 16, 22, 24

(56) References Cited

U.S. PATENT DOCUMENTS 4,060,280 A * 11/1977 Van Loo ................ 297/452.61
4,741,945 A * 5/1988 Brant et al. .................. 428/158
5,052,053 A * 10/1991 Peart et al. ..................... 2/2.16
5,165,752 A * 11/1992 Terry ........................... 297/214
RE34,836 E * 1/1995 Murrell ....................... 351/123
5,553,924 A * 9/1996 Cantor et al. ............ 297/452.27
5,722,482 A * 3/1998 Buckley ........................ 166/10
5,790,980 A * 8/1998 Yewer, Jr. ........................ 2/20
5,947,918 A * 9/1999 Jones et al. .................... 602/58
6,093,468 A * 7/2000 Toms et al. .................... 428/67

* cited by examiner

Primary Examiner—Cheryl A. Juska

(57) ABSTRACT

The invention is concerned with a three-dimensional protective pad which is constructed from a laminate structure having a first top layer of a neoprene/nylon skin combination which is stretchable in all directions. There is a second layer of a non-stretchable neoprene adhered under the first layer. Then there is a third layer of a polyurethane foam of a viscoelastic nature adhered under the second layer. Finally, there is a fourth layer of a neoprene/nylon skin combination which is stretchable in all directions adhered under the third layer. This laminated material is now structured into a three-dimensional shape. Therefore, prior to laminating all of the layers, the second and the third layers are adhered to each other first and then a sectional cut is made through layers, the cut surfaces are then closed by cross stitching through the second layer into the third layer and the cut edges are now glued together. The wider the cut and the shape of the cut determine the pitch of the form of the structure and more than one cut determine the curvature of the three dimensional structure.

8 Claims, 8 Drawing Sheets

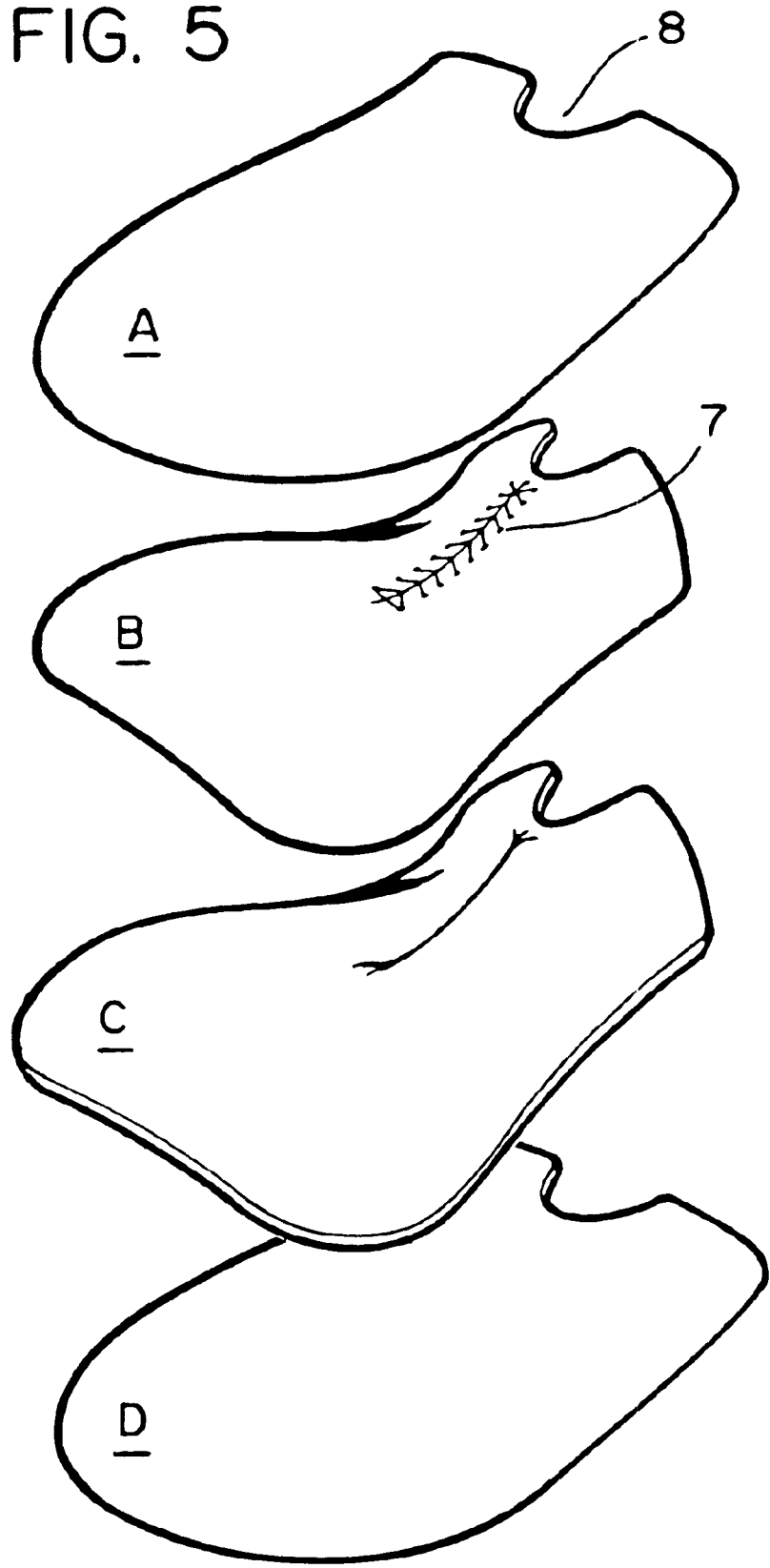

THREE DIMENSIONAL PROTECTIVE PADS

CROSS REFERENCE TO RELATED APPLICATIONS

This application is a Continuation of application Ser. No. 09/294,116 filed on Apr. 19, 1999 and now abandonded which in turn is a Continuation-in-part of the earlier filed Continuation-in-part of an earlier filed application Ser. No. 09/143,408 filed on Aug. 28, 1998 now abandoned which in turn is a Continuation-in-part of application Ser. No. 08/953,285 now abandoned filed on Oct. 17, 1997.

BACKGROUND OF THE INVENTION

The earlier filed applications are concerned with a blunt trauma laminated material while this application uses the very same material to form it into a three dimensional shape to be used as protective pads on the human body such as shin guards, elbow pads, chest or head protectors but not limited thereto. The three dimensional form can also be used as protective horse blankets under the saddle of a rider as will be explained below. To gain an understanding of this invention and the impact it has as a protective structure, some of the disclosure of the earlier filed applications will be repeated herein.

The word "laminated" indicates that the end product is made up of several layers of material that are somehow adhered to each other by either gluing or other processes. The word "trauma" can be interpreted as a bodily injury produced by violence which can be abrupt or as a continuous force in address or manner. The word "blunt" on the other hand should be taken as an opposition to the force so as to weaken or impair the force produced by the violence.

BRIEF SUMMARY OF THE INVENTION

An object of the invention is to form a three dimensional protective structure from a laminated material having several layers different from each other and wherein each layer contributes its own significant characteristics to the whole of the end product, that is, the final laminated structure. The laminated material will reduce or blunt the trauma inflicted upon various areas of the body and it is being structured or shaped for different end uses. Because of the different layers being laminated to each other, they cannot slide relative to each other and therefore maintain a homogeneous structure when it is in its intended end use.

BRIEF DESCRIPTION OF THE DRAWINGS

FIG. 5 shows the finishing steps required to obtain a finished three dimensional structure;

DETAILED DESCRIPTION OF THE INVENTION

Figure 1:
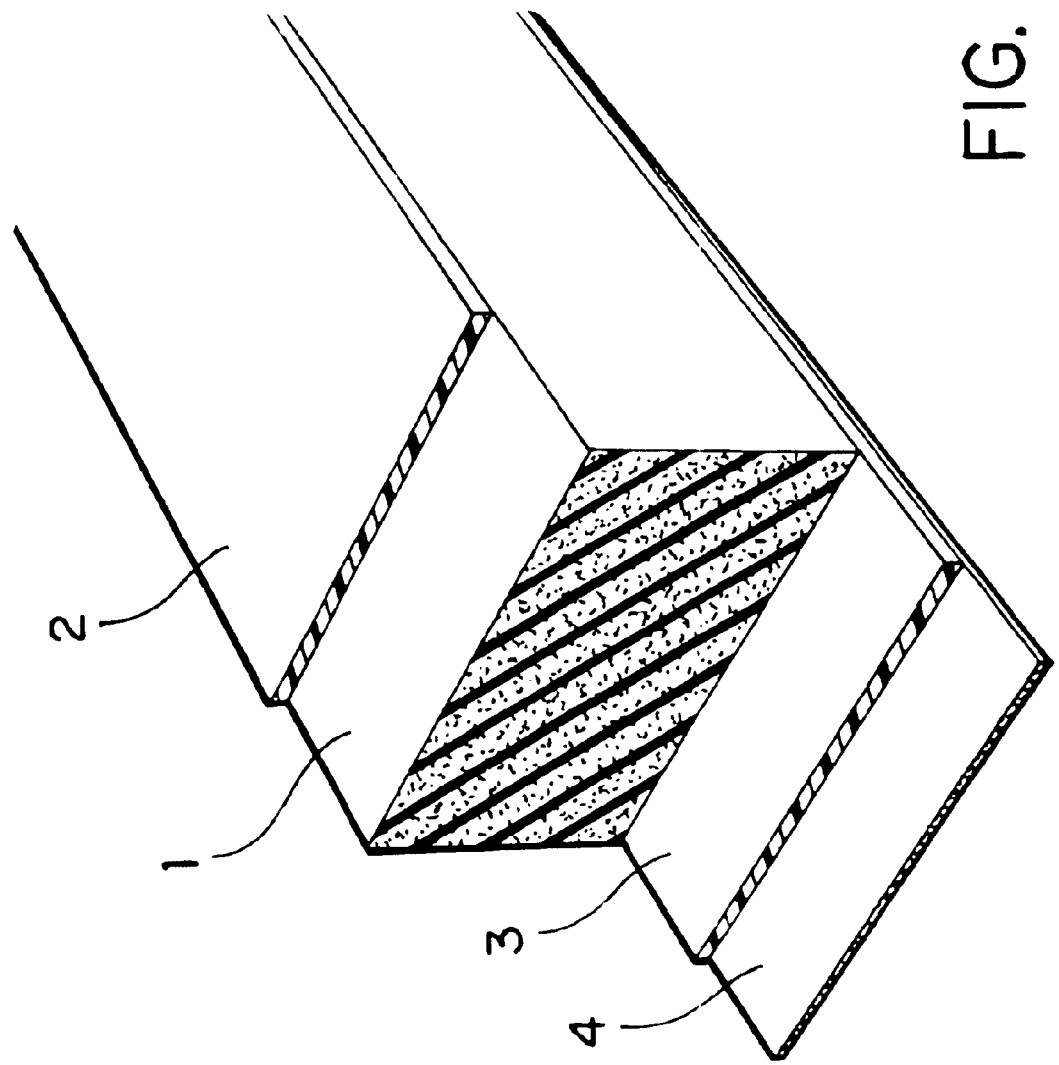
FIG. 1 shows the laminated structure in a perspective view as well as in a stepped view.

FIG. 1 shows the finished laminated material consisting of four layers. For its intended end use, the main layer is layer 1, while the layers 2–4 are of a supporting or enhancing nature. Layer 1 is known under the registered Trademark "CONFOR". It produced by the E.A.R. Specialty Composites Corporation which is a manufacturer of specialty composites. E.A.R. is located in Indianopolis, Ind. and in Newark, Del.

"CONFOR" is a polyurethane foam which has a very slow recovery from pressure. It has five different densities that are color coded based on impact properties and temperature ranges. The above identified copending applications disclose in detail the various color codes.

"CONFOR" is an ergonomic foam, that is, it is user-friendly. It is designed specifically for blunt trauma. However, "CONFOR" is a highly damped urethane foam having unique properties that separates it from other cushioning materials. It resists blunt trauma slowly when being depressed and slowly recovers from the depression unlike standard open cell material foams that quickly depress and spring back to their original state. Some of the main properties of CONFOR are that has a viscoelastic nature, it has an elastic property and it is rate-sensitive. Viscoelasticity means that the foam "flows or relaxes while providing an even pressure distribution. The elastic property means that the foam can support a load without a permanent deformation. This combination allows CONFOR to provide a comfortable support without any pressure points. Being rate-sensitive means that when a shock or impact (high rate or high speed) is applied to the foam, it will act stiff and absorb the blow. When a load is applied slowly, CONFOR will be soft and conforming. This is a function of the dampening effect of the foam.

However, CONFOR itself cannot be used for that purpose alone but must be enhanced or structured by using other materials in combination therewith as will be explained below. CONFOR in its raw state is very useful in reducing blunt trauma but has a limited commercial value because it literally falls apart in extreme temperatures and it cracks when one tries to shape it into two- or three-dimensional shapes or forms such as by pulling it around a limb or a torso of a wearer. It also has a tendency to hold moisture very well which is undesirable in any applications. Therefor, other layers have been added to enhance the CONFOR performance for its intended end use.

Turning now to the description of the other layers, FIG. 1 shows a top layer 2 of a neoprene and it is a blend of E.P.T./S.B.R. It is a very stiff material with no stretch in any direction. It is a closed cell foam.

E.P.T. is an ethylene-propylene-terpolymer neoprene combination, and

S.B.R. is a styrene-butadiene rubber combination.

This top layer is made by the Rubatex Corp. in Bedford, Va. and it is sold under the stock No. R-423-N. Their specification describe the above noted characteristics.

The underside or bottom layer 3 is a blend of a neoprene and Butyl rubber. It has an overall stretch and it is a closed cell foam but of a lesser density than that of layer 2. This bottom layer is also made by the Rubatex Corp. in Bedford Va. and is sold under the stock No. R-1490-N.

Layer 4 is bonded to layer 3 and it is a polyamide skin of knitted material and it has an overall stretch. The neoprene/polyamide skin layer is readily available as a commercial product and is also used for other purposes. It also can be obtained separately because for some other applications, the skin or layer 4 could be made of other materials as long as it is knitted and has an overall stretch.

The lower layer of the stretchable neoprene/nylon combination could also be a magnetized neoprene layer, that is, magnetic particles could be contained within the neoprene composition, which could have a therapeutic value because it is known that magnetic materials stimulate the blood vessels in the muscles.

It can now be seen that the original or raw "CONFOR" has been enhanced by using various laminate layers. Tests have shown that the various top and bottom layers are having a dampening effect when subjected to blunt trauma before effective to transfer a blunt trauma to the center layer 1.

When "CONFOR" is first impacted by a force of blunt trauma, it at first resists the blunt trauma and it changed molecularly to absorb the trauma much like a liquid or a gel as the impact goes through the first layer. The greater the impact, the greater the resistance. This then is a state of absorption and the material, because it is rate-sensitive polymer, slowly comes back to its original state or to its restoration.

The laminated material, as explained above, cannot be shaped into a two- or three-dimensional structure because it cannot be molded. The "CONFOR" layer simply would not survive any heat or cold application or process. With reference to the following Figs., there will now be described a method how the laminated material can be shaped into various two- or three dimensional structures.

Figure 2:
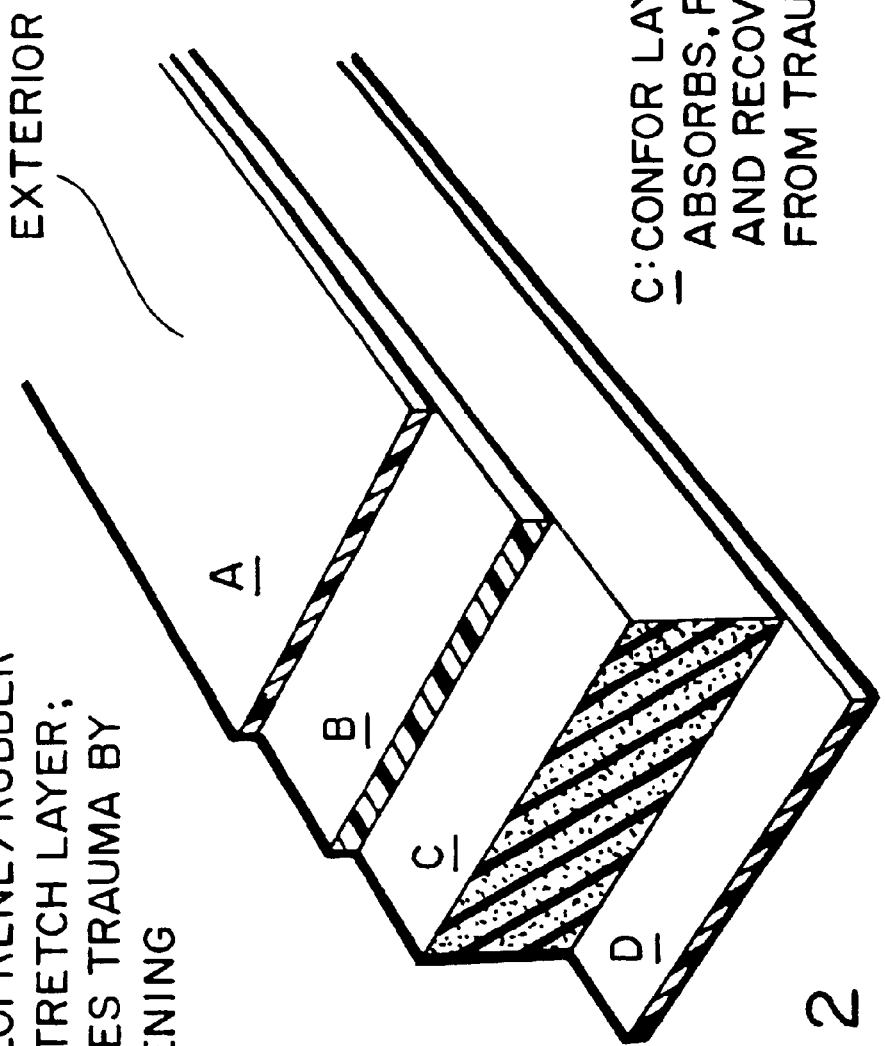
FIG. 2 shows a variation of a laminated structure which is somewhat different from the structure shown in FIG. 1.

Turning now to FIG. 2, there is shown a somewhat different arrangement of the laminated structure of FIG. 1 in that A and D are each a neoprene/polyamide skin layer of about 1/16 of an inch thickness and this layer has a 4-way mobility or stretchability in all directions and is instrumental in sealing the "CONFOR" layer against any moisture.

B is a neoprene/rubber non stretch layer which lessens trauma by dampening the force applied to the structure. Specifically, this second layer consists of a non-stretch ethylene propylene diene monomer and a styrene rubber combination.

C is the "CONFOR" layer which absorbs the blunt trauma force, resists the same and dampens it.

Figure 3:
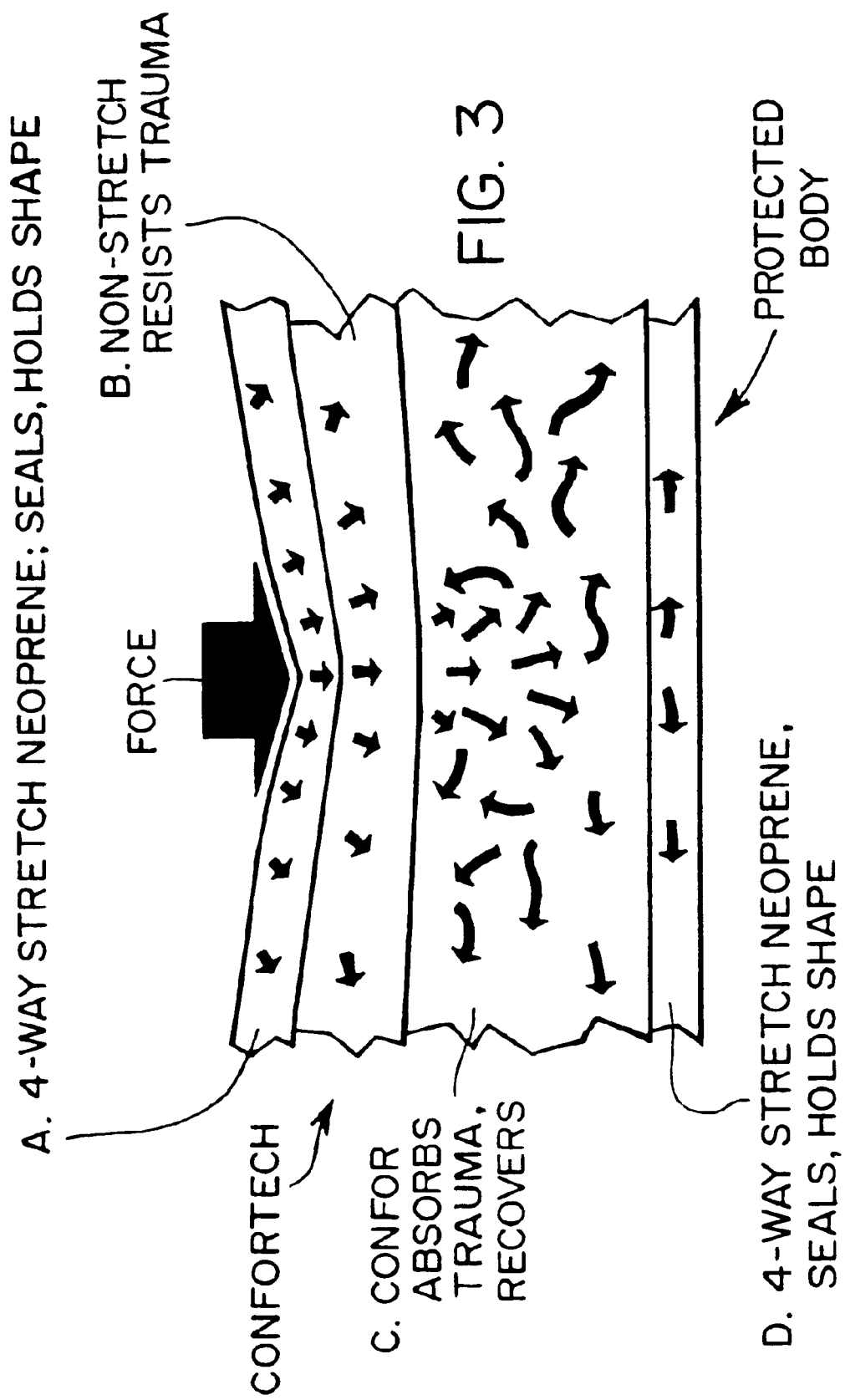
FIG. 3 shows a graphic illustration of what happens when a blunt trauma force is applied to the laminated structure of FIG. 2.

FIG. 3 is a graphic illustration of what happens when a blunt trauma force is applied to the laminated structure of FIG. 2. In this illustration are shown the various layers and the various reactions in the layers to the blunt trauma forces. Also, the various arrows and the direction and concentrations of the same, graphically show the propagation and dissipation of the blunt trauma as it propagates through the laminated structure.

Figure 4A:
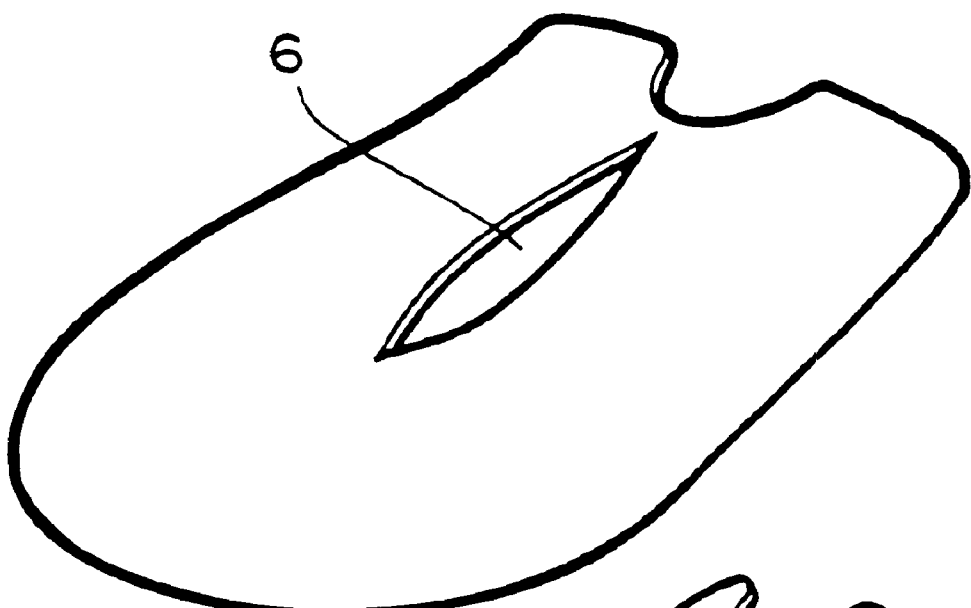
FIGS. 4a and 4b show the initial steps being taken in forming a three dimensional structure.
Figure 4B:
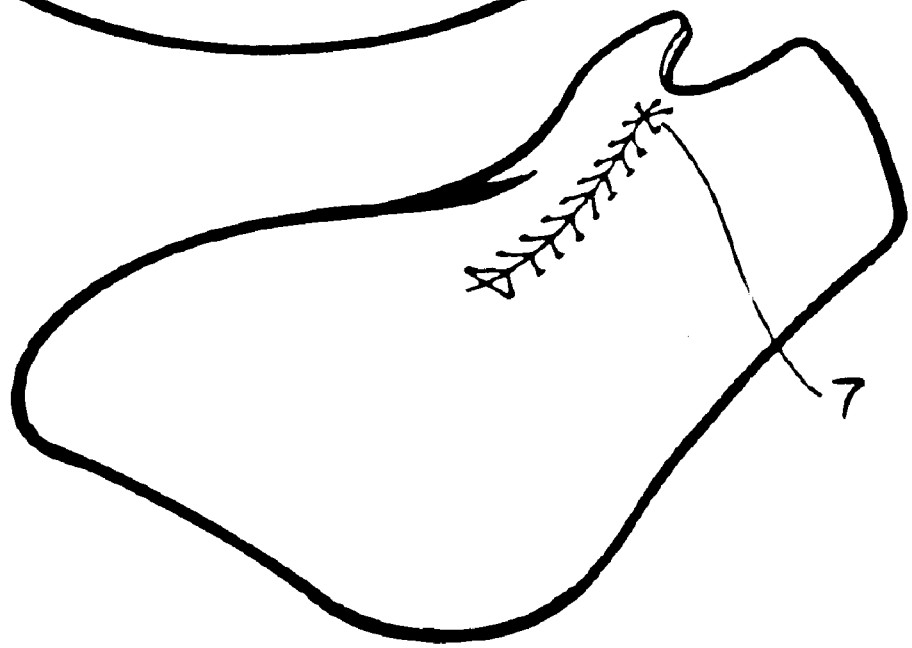

FIGS. 4a and 4b illustrate the initial steps taken in order to form a three-dimensional structure. FIG. 4a consists of the layer B of a non-stretch neoprene/rubber and the "CONFOR" layer C is adhered thereto or laminated together. A predetermined cut 6 is now made all the way through these two layers. The size and the shape of the cut and the material removed thereby will ultimately determine the three-dimensional structure. The cut 6 in FIG. 4a shows the shape of a diamond. The wider the cut the more of a pitch is obtained in the structure of the pad. Once the cut 6 is made, the laminate is placed in a jig and it is sewed closed by cross-stitching 5 through the neoprene layer into the "CONFOR" layer and thereafter the cut faces of the cut are provided with a glue as is shown at 7 in FIG. 4b. This now is a three-dimensional structure that will further need finishing as will be described in FIG. 5.

On the top of the layer B/C combination will now be glued a neoprene/knit nylon layer A which has an overall stretch and the same layer D is glued to the bottom of the "CONFOR" layer C.

Figure 7:
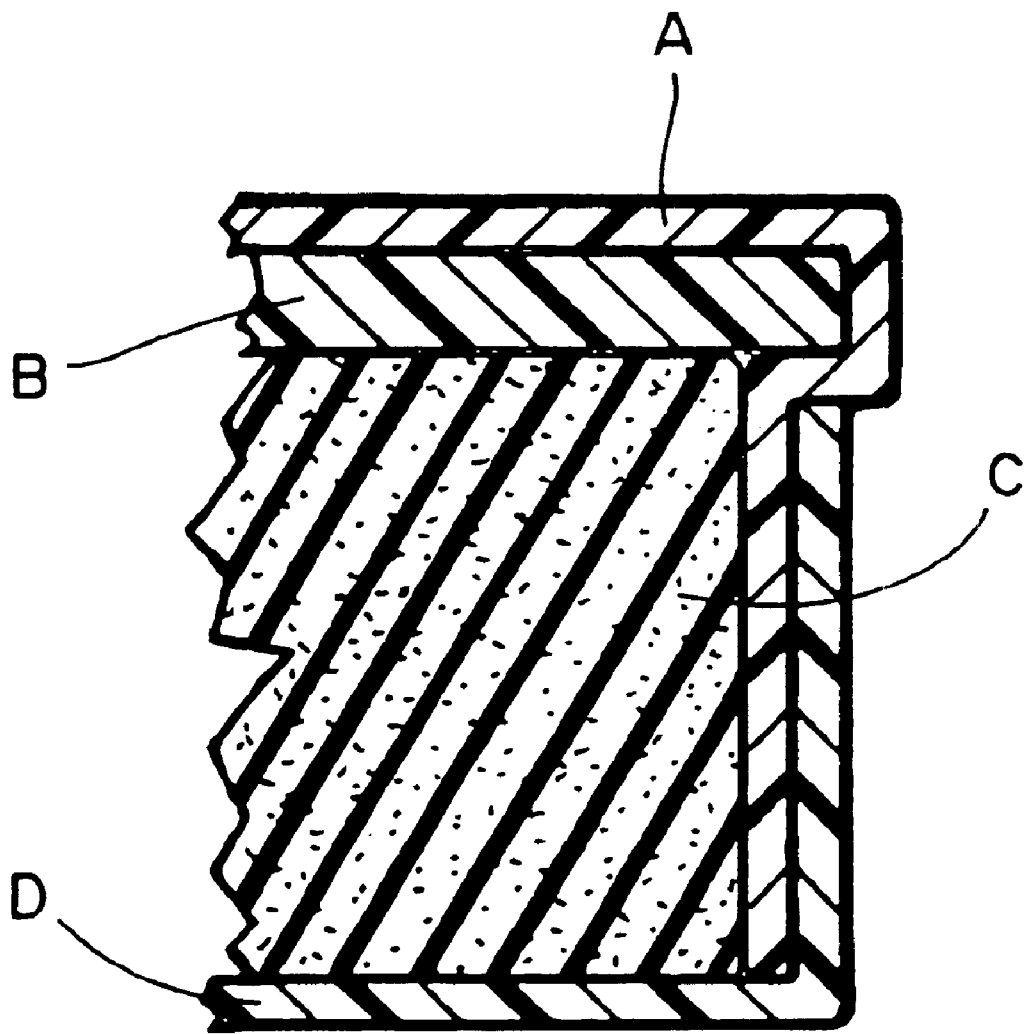
FIG. 7 is an illustration of an edge treatment of the protective pad.

FIG. 7 illustrates how the edge of the protective pad should be finished to prevent any moisture from entering the laminated structure, especially the CONFOR layer. To this end, the layer B is cut somewhat larger in its overall dimension than layer C so as to form a lip. The layer A is still cut larger in its overall dimension than the layer B and the excess material will be glued over the edge of the lip and down the "CONFOR" layer C edge. Thereafter, the bottom layer D is cut somewhat larger in its overall dimension than the layer C and the excess material will be glued over the earlier excess of layer A. This will assure a self-contained structure which will be moisture impervious to be explained below.

The example shown so far pertains to a horse blanket which is used under the saddle of a rider. The cutout 6 would free the neck of the horse while the blanket would cover the withers and the back of the horse.

Figure 6B:
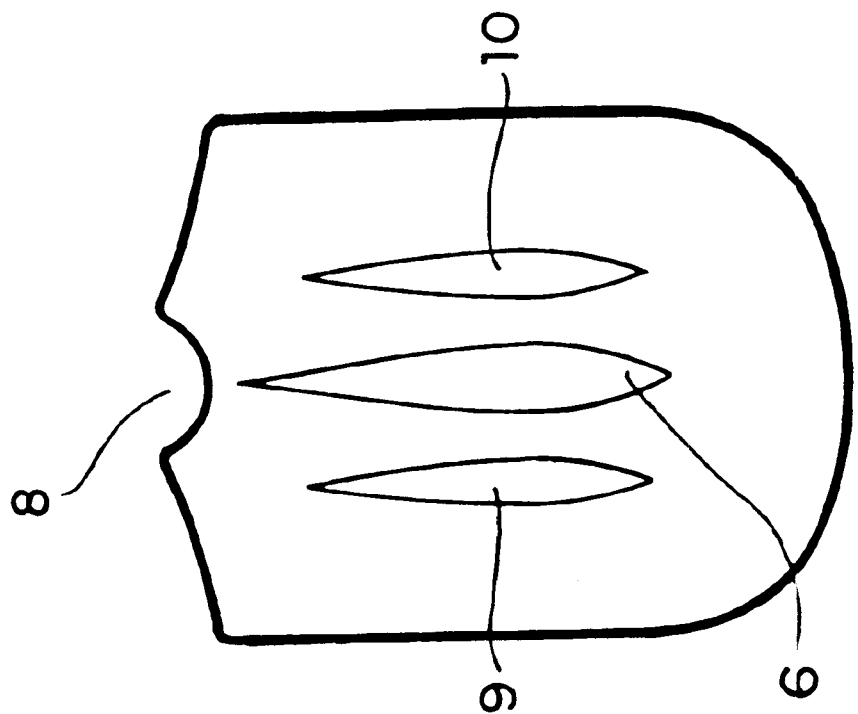
FIGS. 6a and 6b are illustrations of making planar cuts to obtain differently shaped protective pads.
Figure 6A:
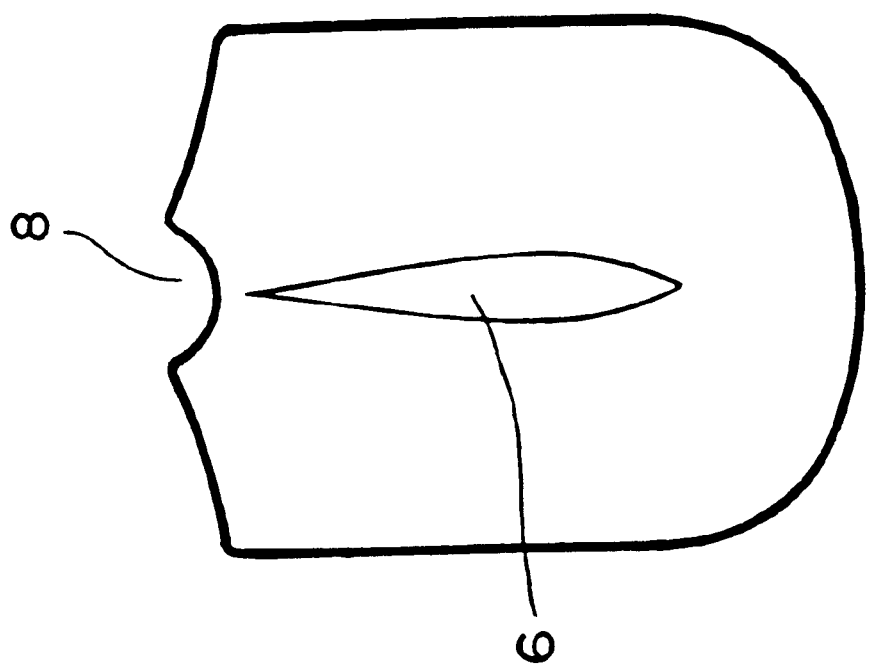

Turning now to FIG. 6a, the size and the shape of the cut 6 determines the three-dimensional shape of the final structure. Thus, for example, the at least one cut 6 of the material; removed will give a gradual rise to the horse blanket to more clearly follow the rise in the horse's back. If more of a curvature is necessary, then more cuts can be made as is shown in FIG. 6b at 9 and 10 resulting in at least three cuts. Unlike other known horse blankets, the blanket of this invention is moisture proof, as was mentioned above. This fact adds to the comfort of the horse because the sweat of the horse is not being absorbed into the blanket.

The inventive pad can also be used to make other three-dimensional protective pads such as elbow and knee pads or shoulder pads or shin guards. The shape of such pads is determined by the initial planar of the material removed and the shape and location of the cut made therein.

Figure 8:
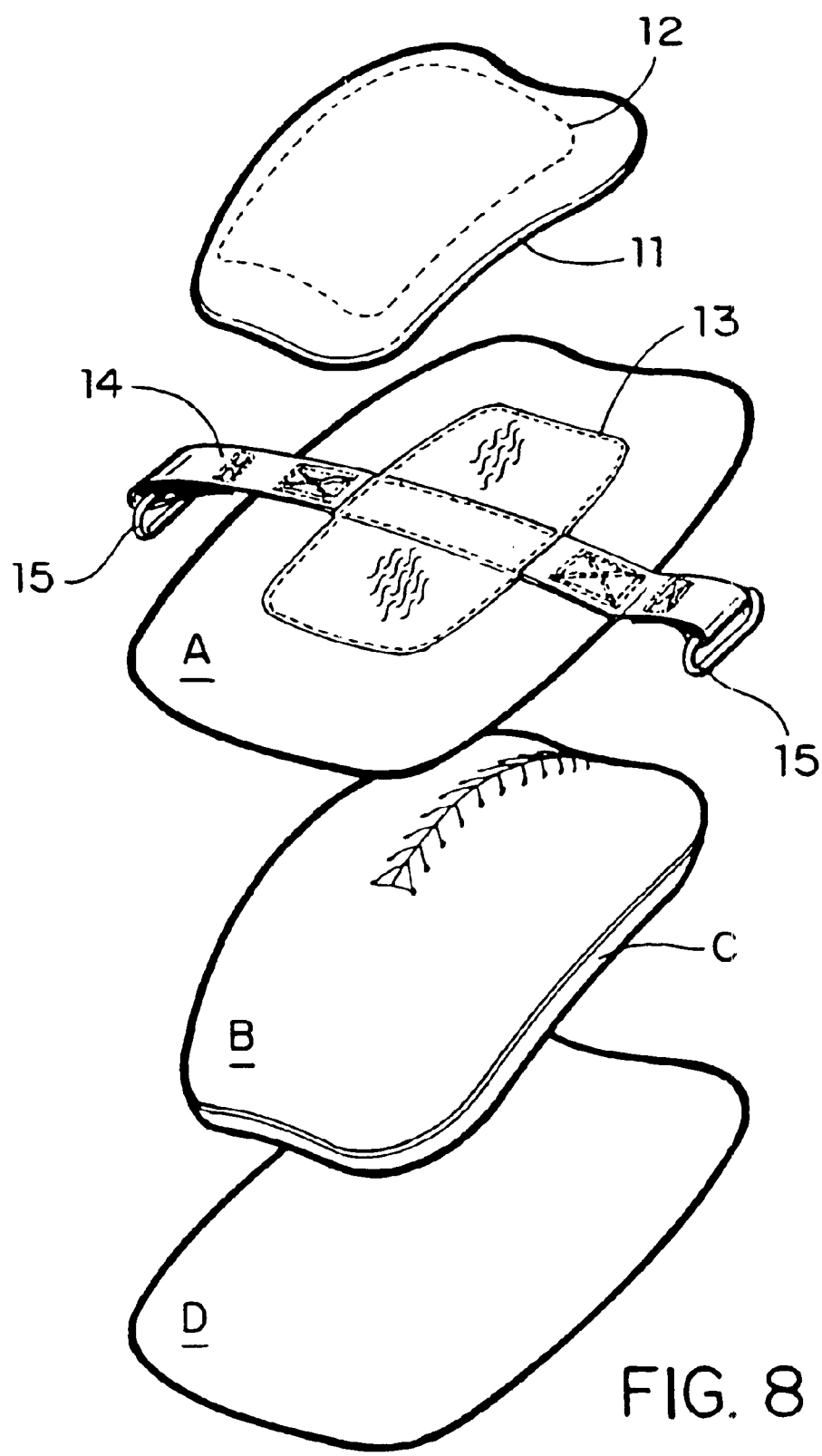
FIG. 8 shows a further development of a protective knee or elbow pad.

FIG. 8 is an example of a knee pad for a foot ball player. The cut 6 is placed in such a manner that a rounded section of a hollow interior fits over the knee cap of the player. The knee cap can be further expanded in its versatility by adding a hardened polyethylene plate 11, or other material, to the top of layer A. This hardened plate 11 should removable therefrom. This could easily be accomplished by sewing a female strip 13 of VELCRO™ to the neoprene stretch layer prior to being glued to the underlying non-stretch neoprene layer B. The male VELCRO™ strip 12 would be glued to the underside of the of the hardened plate 11. The reason why the female VELCRO™ strip 13 is sewn to the outer side of the layer A is so that the foot ball player could wear the protective pad in the pocket of the uniform, whereby the female loops of the VELCRO™ fastener cannot snag in the material of the uniform.

It is again reiterated that there is an advantage of the protective being self-contained and being moisture proof in that a foot ball player, for example on a wet field can not have his protective pads filled up or saturated with moisture which would encumber the player's moves because of the added weight of the moisture in the pad itself.

In a further development, as is shown in FIG. 8, strap or straps 14 having buckles or rings 15 thereon could be sewn to the top side of the upper neoprene stretch layer A prior to being glued to the upper surface of the neoprene layer B. This will enable a player to strap the protective pad around his leg or arm in the event of using the pad as an elbow pad.

I claim:

1. A three dimensional protective pad being constructed as a laminate structure including a first top layer of a neoprene having a nylon skin adhered thereto, said top layer is stretchable in all directions a second layer of a non-stretch neoprene-ethylene-propylene-terpolymer and a styrene butadiene rubber combination adhered under said first layer, a third layer of a viscoelastic polyurethane foam, adhered there under is a fourth layer bottom layer of a neoprene having a nylon skin adhered thereto which is stretchable in all directions, including a hardened polyethylene plate removably attached to an upper surface of said top layer.

2. The protective pad of claim 1, wherein said nylon skin of the first top layer and the fourth bottom layer is a knitted material.

3. The protective pad of claim 1 including female loop fasteners attached to an upper surface of said layer and male hook fasteners attached to an underside of said hardened polyethylene plate.

4. The protective pad of claim 1 including a sectional cut made through said second and said third layers and material removed therefrom which cut is closed by stitching.

5. The protective pad of claim 4, wherein said cut is diamond shaped.

6. The protective pad of claim 4, wherein there are at least three sectional cuts in said second and said third layers.

7. A three dimensional protective pad being constructed as a laminate structure including a first top layer of a neoprene having a nylon skin adhered thereto, said top layer is stretchable in all directions, a second layer of a non-stretch ethylene-propylene diene monomer and a styrene rubber combination adhered under said first layer, a third layer of a viscoelastic foam, adhered there under is a fourth bottom layer of a neoprene having a nylon skin adhered thereto which is stretchable in all directions, wherein said second layer (of non-stretchable neoprene) is larger in its overall dimension than the underlying urethane layer forming a lip there between and the first layer of the neoprene nylon skin combination is larger in its overall dimension than said second layer to thereby leave excess material and wherein said excess material is glued over said lip and to an edge of said urethane layer.

8. The protective pad of claim 7, wherein said fourth layer of said neoprene/nylon skin combination which is stretchable in all directions is larger in its overall dimension than said urethane layer and is glued over the excess material of said first layer.

\* \* \* \* \*